US008565294B2

(12) United States Patent
Szajnowski

(10) Patent No.: US 8,565,294 B2
(45) Date of Patent: Oct. 22, 2013

(54) CLASSIFICATION OF INTERFERENCE

(75) Inventor: Wieslaw Jerzy Szajnowski, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 265 days.

(21) Appl. No.: 13/116,468

(22) Filed: May 26, 2011

(65) Prior Publication Data
US 2011/0292988 A1 Dec. 1, 2011

(30) Foreign Application Priority Data

May 27, 2010 (EP) .................................. 10164050

(51) Int. Cl.
*H04B 17/00* (2006.01)
*H03D 1/04* (2006.01)

(52) U.S. Cl.
USPC .......................................... 375/227; 375/346

(58) Field of Classification Search
USPC ............ 375/227, 285, 346; 455/226.1, 226.2, 455/226.3
See application file for complete search history.

(56) References Cited

U.S. PATENT DOCUMENTS

| | | | |
|---|---|---|---|
| 4,901,082 A | 2/1990 | Schreiber et al. | |
| 5,274,380 A | 12/1993 | Yatsuka et al. | |
| 6,118,805 A * | 9/2000 | Bergstrom et al. | 375/132 |
| 6,122,309 A * | 9/2000 | Bergstrom et al. | 375/130 |
| 6,240,282 B1 * | 5/2001 | Kleider et al. | 455/226.1 |
| 7,038,608 B1 | 5/2006 | Gilbert | |
| 7,248,215 B2 | 7/2007 | Pleva et al. | |
| 7,336,219 B1 | 2/2008 | Lohmeier et al. | |
| 7,345,619 B2 | 3/2008 | Hunt | |
| 7,379,018 B1 | 5/2008 | Lohmeier et al. | |
| 7,400,290 B2 | 7/2008 | Woodington et al. | |
| 7,403,153 B2 | 7/2008 | Kelly, Jr. et al. | |

(Continued)

FOREIGN PATENT DOCUMENTS

JP 5-240947 A 9/1993

OTHER PUBLICATIONS

Brooker, "Mutual Interference of Millimeter-Wave Radar Systems," IEEE Transactions on Electromagnetic Compatibility, vol. 49, No. 1, Feb. 2007, pp. 170-181.

(Continued)

*Primary Examiner* — Khanh C Tran
(74) *Attorney, Agent, or Firm* — Birch, Stewart, Kolasch & Birch, LLP

(57) ABSTRACT

An interference classifier is disclosed for determining the type of interference present in a signal. The interference classifier 601 comprises a buffer 602 operable to receive and store data comprising samples of a signal; a scale factor calculator 603 operable to use the signal samples to calculate a scale factor in dependence upon the levels of the signal samples; a normaliser 604 operable to calculate normalised signal samples by using the scale factor to normalise the signal samples; a nonlinear transformer 605 operable to perform a nonlinear transform on the normalised signal samples to calculate transformed signal samples; an averaging circuit 606 operable to calculate an average of the transformed signal samples; and a comparator 607 operable to compare the calculated average of the transformed signal samples to a predetermined threshold level in order to determine the type of interference present in the received signal. The interference classifier 601 disclosed herein performs an advantageous type of nonlinear transform that provides an improvement in detection probability over known kurtosis-based interference classifiers. Applications of the interference classifier 601 include automotive radar systems, radio astronomy, microwave radiometry, weather forecasting and cognitive radio networks.

19 Claims, 15 Drawing Sheets

(56) References Cited

U.S. PATENT DOCUMENTS

| | | |
|---|---|---|
| 2002/0027522 A1 | 3/2002 | Tullsson |
| 2007/0120731 A1 | 5/2007 | Kelly, Jr. et al. |
| 2007/0152869 A1 | 7/2007 | Woodington et al. |
| 2007/0152870 A1 | 7/2007 | Woodington et al. |
| 2007/0152872 A1 | 7/2007 | Woodington |
| 2007/0152873 A1 | 7/2007 | Hunt |
| 2007/0152874 A1 | 7/2007 | Woodington |
| 2007/0156799 A1 | 7/2007 | Gilbert |
| 2008/0001809 A1 | 1/2008 | Woodington et al. |
| 2008/0018523 A1 | 1/2008 | Kelly, Jr. et al. |

OTHER PUBLICATIONS

De Roo et al., "Sensitivity of the Kurtosis Statistic as a Detector of Pulsed Sinusoidal RFI," IEEE Trans. Geosci. Remote Sens., No. 7, vol. 45, Jul. 2007, pp. 1938-1946.

Fischman et al., "Development and Integration of the Aquarius Scatterometer Processor/Control Electronics for Achieving High Measurement Accuracy," Radar Conference, 2009 IEEE, IEEE, Piscataway, NJ, USA, May 4, 2009, pp. 1-6, XP-031461558.

International Telecommunications Union Recommendation, ITU-R RS. 1029-2, 1994-1997-2003, pp. 1-5.

Misra et al., "Microwave Radiometer Radio-Frequency Interference Detection Algorithms: A Comparative Study," IEEE Transactions on Geoscience and Remote Sensing, No. 11, vol. 47, Nov. 2009, pp. 3742-3754, XP-011278490.

Niamsuwan et al., "Examination of a simple pulse-blanking technique for radio frequency interference mitigation," Radio Science, vol. 40, RS5S03, 2005, pp. 1-11.

Skou et al., "L-Band RFI as Experienced During Airborne Campaigns in Preparation for SMOS," IEEE Transactions on Geoscience and Remote Sensing, vol. 48, No. 3, Mar. 2010, pp. 1398-1407, XP-011284226.

Zhang et al., "Combating Pulsed Radar Interference in Radio Astronomy," The Astronomical Journal, vol. 126, Sep. 2003, pp. 1588-1594.

International Telecommunications Union Recommendation, ITU-R RS. 1029-2, pp. 1-5.

* cited by examiner

CLASSIFICATION OF INTERFERENCE

CLAIM TO PRIORITY

The present application claims priority from European patent application number EP 10164050.6 filed on 27 May 2010, the full contents of which are incorporated herein by cross-reference.

FIELD OF THE INVENTION

The present invention relates to a method and apparatus for discriminating between transient interference originating from noise bursts and transient interference generated by sinusoidal signals, including frequency-swept waveforms.

BACKGROUND OF THE INVENTION

There are many known cases of detrimental effects of interference on various active and passive sensing systems. Passive systems are especially vulnerable because they do not transmit any probing signals so that the interference effects cannot be mitigated by simply increasing the transmitted power.

For example, in radio astronomy at the 1.2-1.4 GHz frequency band, spectroscopy and pulsar observations are corrupted by transmissions of ground-based aviation radars. Since radio telescopes operate at the highest possible sensitivity levels, they can detect radar pulses through the antenna side-lobes at distances greater than 100 km. This range may increase significantly when the telescope captures pulses reflected by an object, such as an aircraft.

Another example is microwave radiometry that exploits natural thermal emission produced by the Earth's surface and atmosphere to examine its properties. Unfortunately, the microwave frequency bands utilised for passive remote sensing are also used for communication and surveillance purposes; such applications involve the generation and transmission of high-level microwave signals. The resulting interference manifests itself as the appearance of 'hot spots' that will corrupt images of microwave brightness temperature.

A passive energy sensor determines the level of microwave energy by integrating the power of all natural (desired) and man-made (undesired) emissions over a time interval ranging from 10 to 200 milliseconds. Although, in this case, the information of interest is the level of energy originating from natural sources alone, any man-made interference captured by the sensor will also contribute to the result. Therefore, a passive energy sensor is not capable of discriminating between man-made interference and interference originated from natural phenomena.

According to the International Telecommunications Union Recommendation (ITU-R RS.1029-2): "studies have established that measurements in absorption bands are extremely vulnerable to interference because, in general, there is no possibility to detect and to reject data that are contaminated by interference, and because propagation of undetected contaminated data into numerical weather prediction (NWP) models may have a destructive impact on the reliability/quality of weather forecasting".

If man-made interference is of transient nature, i.e. present during a relatively small fraction of the total observation time, it is possible to excise the intervals containing interference, assuming that such intervals can be detected in a reliable manner. A number of so-called pulse-blanking techniques have been described in the literature; for example, see: N. Niamsuvan et al., "Examination of a simple pulse-blanking technique for radar interference mitigation," *Radio Sci.*, vol. 40, RS5S03, 2005.

One useful pulse-blanking scheme is presented in: Q. Zhang et al., "Combating Pulsed Radar Interference in Radio Astronomy," *Astronom J.*, pp. 1588-1594, September 2003. The proposed interference rejection method is based on replacing corrupted samples by zeros, and retaining all other original samples. As a result, a fast Fourier transform (FFT) is performed on a data frame of the original 'length' but also including a number of all-zero blocks.

Irrespective of a particular scheme of pulse blanking, its efficacy will depend on reliable detection of man-made interference. It should be pointed out that the signal level itself cannot be exploited to detect interference because high-level transients may also originate from natural phenomena. Therefore, an optimal pulse-blanking scheme should incorporate some form of a level detector followed by a classifier capable of discriminating between man-made interference and signals of natural origin.

In general, many man-made transmissions have a form of a pulsed sine-wave carrier modulated in phase or frequency. Discrete-time samples of such a signal obtained from asynchronous sampling will have the same statistical properties as those of a sampled sine wave with a random phase. On the other hand, in general, signals generated by natural phenomena may be represented by a random Gaussian process.

An interference classifier is therefore required to determine whether an observed signal represents a Gaussian random process or a noisy sine wave with randomly varying phase.

Such an interference classifier also has applications in cognitive radio networks. A requirement for improving such networks is a high quality spectrum sensing device to detect an unused spectrum in order to share it without any harmful interference with other users. Because simple energy detectors cannot provide the reliable detection of signal presence, more sophisticated methods are required.

In the above and other applications, a signal being processed comprises a dominant-frequency waveform combined with noise and also man-made interference of transient nature. The presence of transient interference will significantly increase the level of background noise in the frequency domain. Consequently, in conventional systems, a reliable detection of small frequency components will be practically impossible. Therefore, any frequency analysis method to be of practical use should incorporate some means of efficient rejection or suppression of interference.

For example in automotive frequency-modulated continuous-wave (FMCW) radar, effects of transient interference of any type may be reduced by exploiting signal blanking. However, while noise bursts can only be suppressed by employing signal blanking, chirp interference effects may additionally be mitigated by changing in a suitable manner the characteristics of a transmitted waveform. Therefore, it is of practical importance to discriminate between these two classes of transient interference.

A known type of interference classifier is based on determining a value of kurtosis from a set of samples under examination. Kurtosis is defined as the ratio of the fourth central moment to the square of the second central moment. Accordingly, in a case of K zero-mean signal samples $x_1, x_2, \ldots, x_k, \ldots, x_K$, an empirical kurtosis $K_X$ can be determined from:

$$K_X = \left(\frac{1}{K}\sum_{k=1}^{K} x_k^4\right)\left[\left(\frac{1}{K}\sum_{k=1}^{K} x_k^2\right)^{-2}\right] \quad \text{Eqn. 1}$$

It is known that for noise, modelled by a random Gaussian process, the kurtosis is equal to three, independent of the noise level. However, in the case of a randomly sampled sine wave of any amplitude, the kurtosis is equal to 1.5. Therefore, the value of empirical kurtosis, determined from a set of samples under examination, can be compared to a predetermined threshold to decide whether the set is more likely to represent noise or rather a randomly sampled sine wave.

The performance of a kurtosis-based interference classifier has been analyzed in a number of publications; for example, see: R. D. De Roo et al., "Sensitivity of the Kurtosis Statistic as a Detector of Pulsed Sinusoidal RFI," *IEEE Trans. Geosci. Remote Sens.*, pp. 1938-1946, July 2007.

A recent review of various state-of-the-art methods is presented in: S. Misra et al., "Microwave Radiometer Radio-Frequency Interference Detection Algorithms: A Comparative Study," *IEEE Trans. Geosci. Remote Sens.*, pp. 3742-3754, November 2009.

Although various ad-hoc interference detection and classification procedures have been exploited in many known systems, no statistically optimal classifiers have been devised.

An improved method and apparatus for discriminating between man-made interference and noise interference of natural origin is therefore desired.

SUMMARY OF INVENTION

According to the present invention, there is provided an interference classifier for determining whether a received signal contains a noise burst or interference comprising a sinusoidal signal, the interference classifier comprising: a buffer operable to receive and store data comprising samples of a signal; a scale factor calculator operable to calculate a scale factor for the signal samples in dependence upon the levels of the received signal samples; a normaliser operable to calculate normalised signal samples, y, by using the scale factor to normalise the received signal samples; a nonlinear transformer operable to perform a nonlinear transform, T(y), on the normalised signal samples, y, to calculate transformed signal samples; an averaging circuit operable to calculate an average level of the transformed signal samples; and a comparator operable to compare the calculated average level of the transformed signal samples to a predetermined threshold level in order to determine whether the signal contains interference comprising a sinusoidal signal; wherein: the nonlinear transformer is operable to perform a nonlinear transform, T(y), comprising a combination of a first function, T1($y$), and a second function, T2($y$), wherein the first function defines the transform to be applied to normalised signal samples having a value not exceeding a transition value, $y_t$, and the second function defines a transform to be applied to normalised signal samples having a value at or above the transition value $y_t$, and wherein: T1($y$) is a non-decreasing function with increasing normalised signal sample values; and T2($y$) is a decreasing function with increasing normalised signal sample values.

The nonlinear transform represents a ratio of the conditional probabilities p(y|N1) and p(y|N2) where N1 is burst noise and N2 is interference comprising a sinusoidal signal.

The first function may be an increasing function with increasing normalised signal sample values or a function defining a horizontal line. In the case of an increasing function, the magnitude of the mean slope of the first, increasing function is less than the magnitude of the mean slope of the second, decreasing function.

Preferably, the normaliser is operable to determine a magnitude of each signal sample and is operable to calculate the normalised signal samples by dividing the determined magnitudes of the signal samples by the scale factor.

Preferably, the nonlinear transformer is operable to perform a nonlinear transform defined by a combination of a first function comprising a Lorentz function and a second function comprising a parabola.

Preferably, the scale factor calculator and the nonlinear transformer are operable to calculate a plurality of different types of scale factors and apply a plurality of different nonlinear transforms, respectively, and the scale factor calculator and nonlinear transformer are configured to select between the different types of scale factors and the different nonlinear transforms, in dependence upon an input control signal defining a type of normalisation to be applied to a received signal under test. Such a reconfigurable interference classifier can advantageously perform the most appropriate type of normalisation with respect to the operating environment.

The present invention further provides a method of determining whether a received signal contains a noise burst or interference comprising a sinusoidal signal, the method comprising: calculating a scale factor in dependence upon the levels of samples of the received signal; calculating normalised signal samples, y, by using the scale factor to normalise the received signal samples; performing a nonlinear transform, T(y), on the normalised signal samples, y, to calculate transformed signal samples; calculating an average level of the transformed signal samples; and comparing the calculated average level of the transformed signal samples to a predetermined threshold level in order to determine whether the signal contains interference comprising a sinusoidal signal; wherein: the nonlinear transform, T(y), comprises a combination of a first function, T1($y$), and a second function, T2($y$), wherein the first function defines the transform to be applied to normalised signal samples having a value not exceeding a transition value, $y_1$, and the second function defines a transform to be applied to normalised signal samples having a value at or above the transition value y, and wherein: T1($y$) is a non-decreasing function with increasing normalised signal sample values; and T2($y$) is a decreasing function with increasing normalised signal sample values.

The present invention also provides a computer program product, such as a storage medium, storage device or a signal, carrying computer program instructions to program a programmable processing apparatus to become operable to perform a method as set out above.

The present invention is particularly applicable to the classification of radio-frequency interference signals, but can be applied to other frequencies.

LIST OF FIGURES

Figure 10:
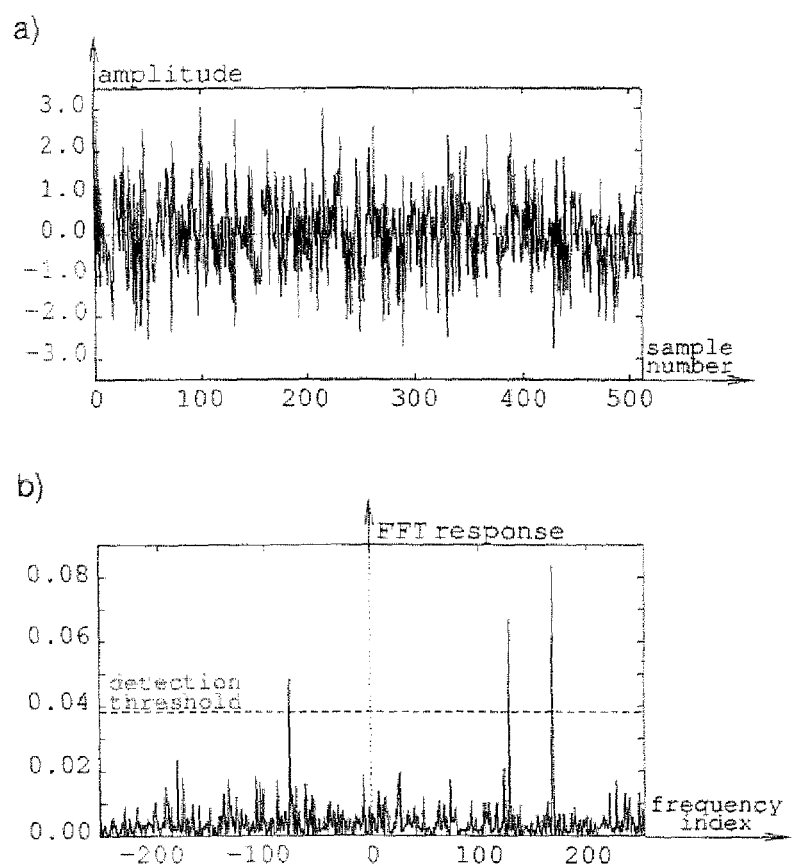

FIG. 10 *a*) is a data frame comprising three sine waves corrupted by background noise.

FIG. 10 *b*) is a frequency-domain representation of the data frame of FIG. 10 *a*).

Figure 11:
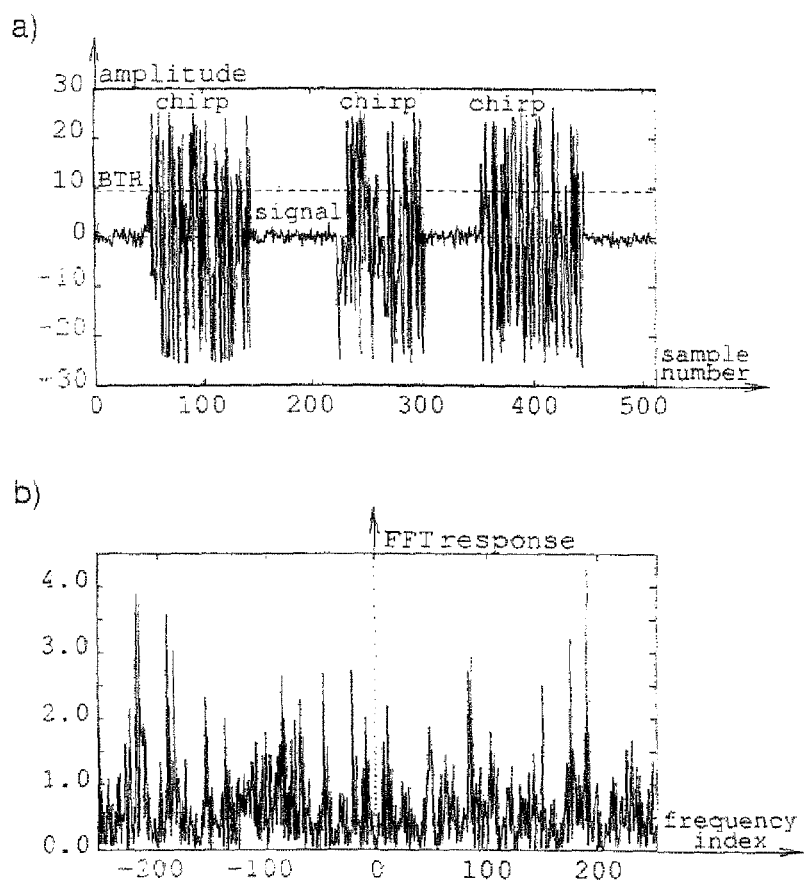

FIG. 11 *a*) is a data frame comprising three sine waves corrupted by background noise and additionally by three high-level frequency chirps.

FIG. 11 *b*) is a frequency-domain representation of the data frame of FIG. 11 *a*).

Figure 12:
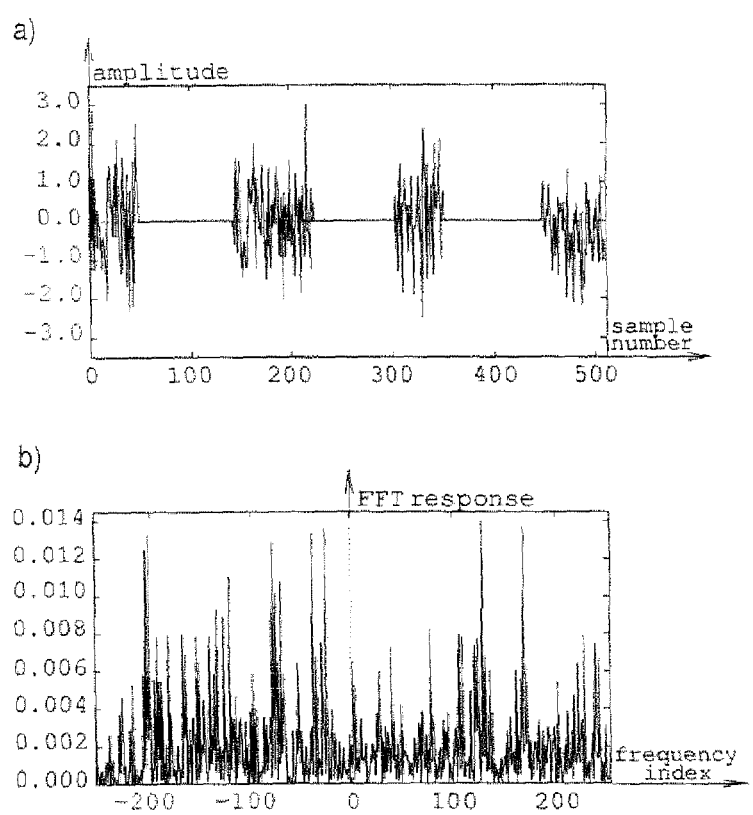

FIG. 12 *a*) is a modified (by blanking) data frame comprising three sine waves corrupted by background noise and additionally by three high-level frequency chirps.

FIG. 12 *b*) is a frequency-domain representation of the data frame of FIG. 12 *a*).

Figure 13:
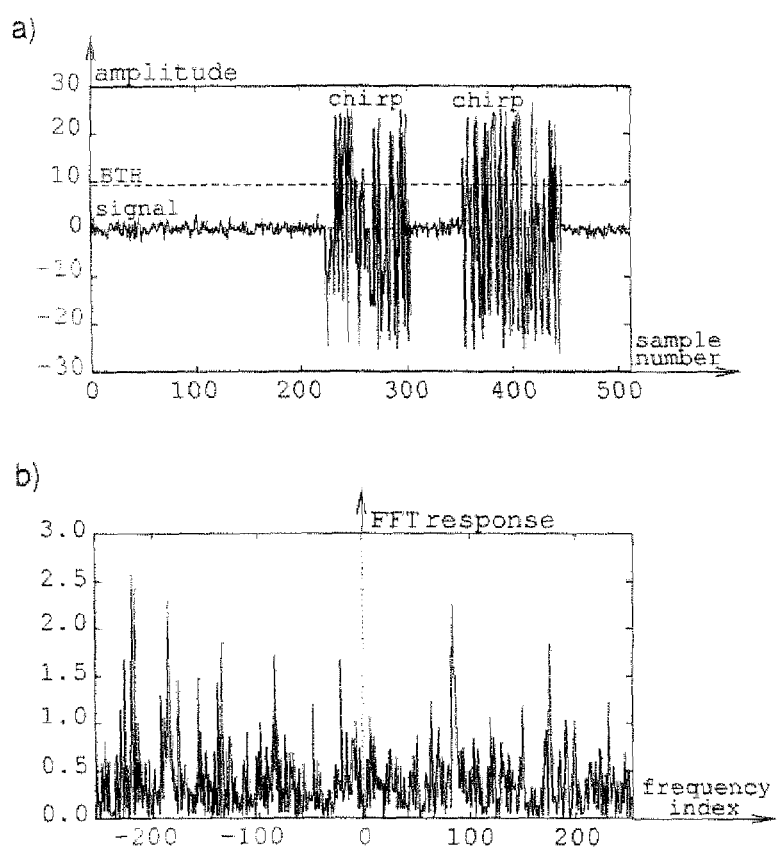

FIG. 13 *a*) is a data frame comprising three sine waves corrupted by background noise and additionally by two high-level frequency chirps.

FIG. 13 *b*) is a frequency-domain representation of the data frame of FIG. 13 *a*).

Figure 14:
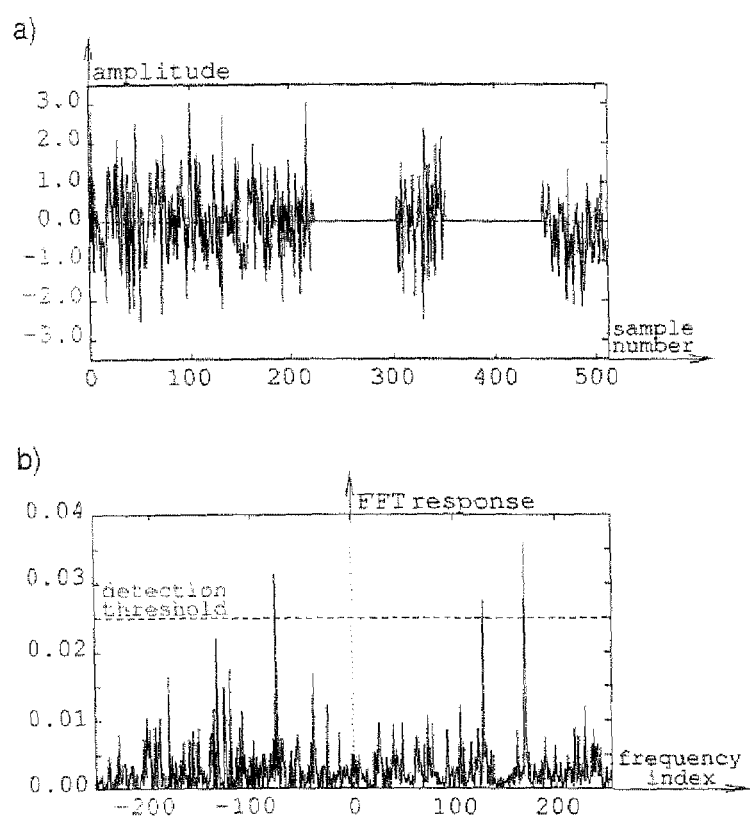

FIG. 14 *a*) represents a modified (by blanking) data frame comprising three sine waves corrupted by background noise and additionally by two high-level frequency chirps.

FIG. 14 *b*) is a frequency-domain representation of the data frame of FIG. 14 *a*).

Figure 15:
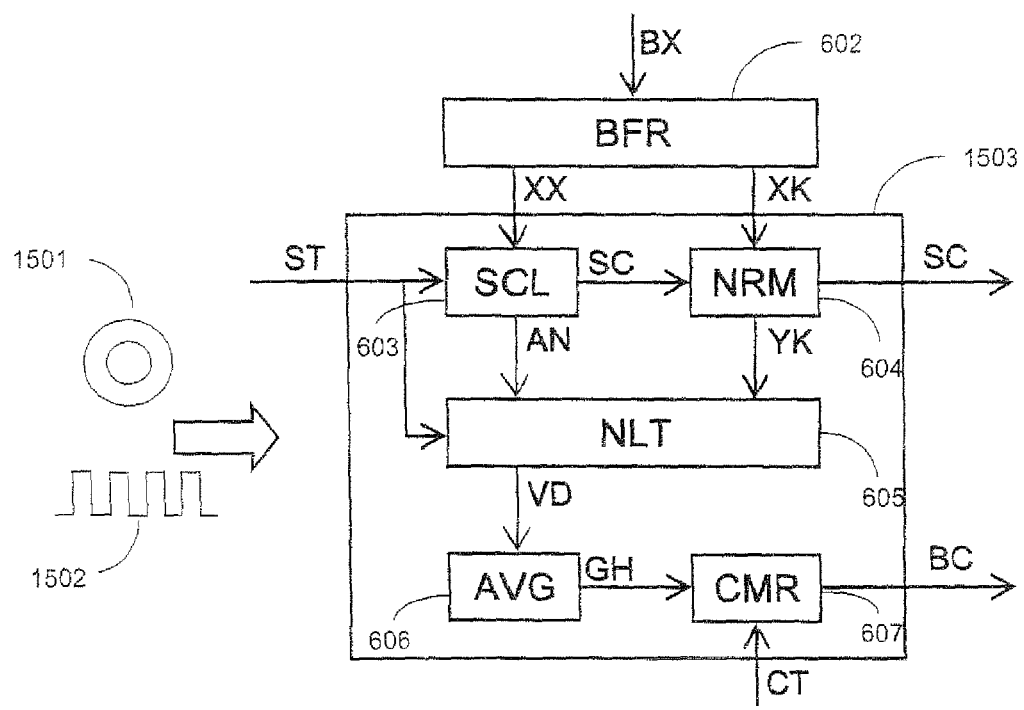

FIG. 15 shows an embodiment of an interference classifier implemented using computer program instructions.

DESCRIPTION OF EMBODIMENTS

Before describing some practical embodiments of the present invention, the underlying theory behind the embodiments is provided.

Consider a received signal that comprises standard background noise (e.g. thermal noise) and pulse-like high-level interference (i.e. transient interference). Such transient interference may have originated either from a short burst of wideband noise or from a pulse with frequency-modulated carrier (a chirp).

In systems employing discrete-time signal processing, a noise burst will produce a sequence of samples having a Gaussian distribution, whereas a frequency chirp will generate samples with the same characteristics as those obtained by random sampling of a constant-amplitude sinusoidal wave. This observation can be exploited in many different ways to develop a statistical procedure for discriminating between noise bursts and chirps. However, neither duration nor the power of observed transient interference can provide any useful information regarding the type of such interference.

From a statistical point of view, the problem of discriminating between a noise burst B and a frequency chirp C is equivalent to selecting one of two alternative hypotheses, H0 and H1, where:

$H0$=noise burst $B$ present $H1$=chirp $C$ present

Accordingly, K signal samples $x_1, x_2, \ldots, x_k, \ldots, x_K$ are characterized by one of two conditional probability density functions, namely:

under hypothesis $H0: p(x_k|B), k=1,2,\ldots,K$       Eqn. 2 under hypothesis $H1: p(x_k|C), k=1,2,\ldots,K$       Eqn. 3

Hypothesis H1 will be selected when the likelihood ratio, $L(x_1, x_2, \ldots, x_K)$, exceeds some predetermined decision threshold level, where the likelihood ratio is defined as:

$$L(x_1, x_2, \ldots, x_K) \triangleq \prod_{k=1}^{K} \frac{p(x_k|C)}{p(x_k|B)} \qquad \text{Eqn. 4}$$

In practice, it is more convenient to utilise an equivalent procedure based on the log-likelihood ratio, ln L:

$$\ln L = \frac{1}{K}\sum_{k=1}^{K}[\ln p(x_k|C) - \ln p(x_k|B)] > T_X \qquad \text{Eqn. 5}$$

where, $T_x$ is a predetermined decision threshold.

The present inventor has noted that the level of interference to be classified cannot be known a priori.

However, the inventor has devised a nonlinear transform which approximates the ratio of $p(x_k|C)$ and $p(x_k|B)$ and which provides a greatly improved practical way of discriminating between frequency chirps and noise bursts.

Normalisation Utilising Mean Absolute Deviation—Robust Classifier

In accordance with one embodiment of the invention, a data block of suitable extent is selected from available data, and K signal samples $x_1, x_2, \ldots, x_k, \ldots, x_K$ in the block are used to determine the mean absolute deviation as follows:

$$M_A = \frac{1}{K}\sum_{k=1}^{K}|x_k| \qquad \text{Eqn. 6}$$

The extent of the data block is so chosen as to capture a substantial portion of the shortest expected transient interference. When the mean absolute deviation $M_A$ exceeds a predetermined decision threshold, $T_N$, the presence of interference is declared.

Preferably, the decision threshold $T_N$ is set at about three or four times greater than the rms (root-mean-squared) value $\sigma_N$ of background noise.

In the case of a noise burst B, the mean absolute deviation tends to:

$$M_A = \sqrt{\frac{2}{\pi}} \sigma_B \approx 0.8\sigma_B \qquad \text{Eqn. 7}$$

where $$\sigma_B = \sqrt{\sigma_0^2 + \sigma_N^2} \qquad \text{Eqn. 8}$$

$\sigma_B$ is the rms value of the sum of background noise and burst noise with respective variances $\sigma_N^2$ and $\sigma_O^2$.

When a chirp C with amplitude A is observed, and the level of background noise is low (say, $\sigma_N < A/5$), the mean absolute deviation $M_A$ is approximately equal to:

$$M_A \approx \frac{2A}{\pi} \qquad \text{Eqn. 9}$$

It is noted that, in practice, both the parameters, $\sigma_B$ and A, are unknown.

The primary sequence $\{x_k\}$ of samples is converted into a corresponding secondary sequence $\{y_k\}$ by using a normalising transformation:

$$y_k = \frac{|x_k|}{M_A}, k = 1, 2, \ldots, K \qquad \text{Eqn. 10}$$

The purpose of the above transformation is to make the observations $\{y_k\}$ independent of the unknown parameter $\sigma_B$ and A.

In the case of a noise burst B, samples $\{y_k\}$ will represent realizations of a Gaussian non-negative random variable with probability density function of the form:

$$p(y|B) = \frac{2}{\pi} \exp\left(-\frac{y^2}{\pi}\right), y \geq 0 \qquad \text{Eqn. 11}$$

When a chirp C is observed, the probability density function p(y|C) can be expressed in a closed form only when background noise is negligible, i.e., when $A \gg \sigma_N$. In such a case:

$$p(y|C) = \frac{4}{\pi\sqrt{\pi^2 - 4y^2}}, 0 \leq y \leq \frac{\pi}{2} \qquad \text{Eqn. 12}$$

On the other hand, when background noise is present, p(y|C) can be regarded as a representation of the underlying ordinary probability density function, $p_0(y)$ when diffusing effects of added noise are taken into account, where $$p_0(y) = \frac{4}{\pi\sqrt{\pi^2 - 4y^2}}, 0 \leq y \leq \frac{\pi}{2}.$$

The discrepancy between the shape of the representation p(y|C) and that of the underlying probability density function $p_0(y)$ will increase for higher levels of added noise.

Figure 1:
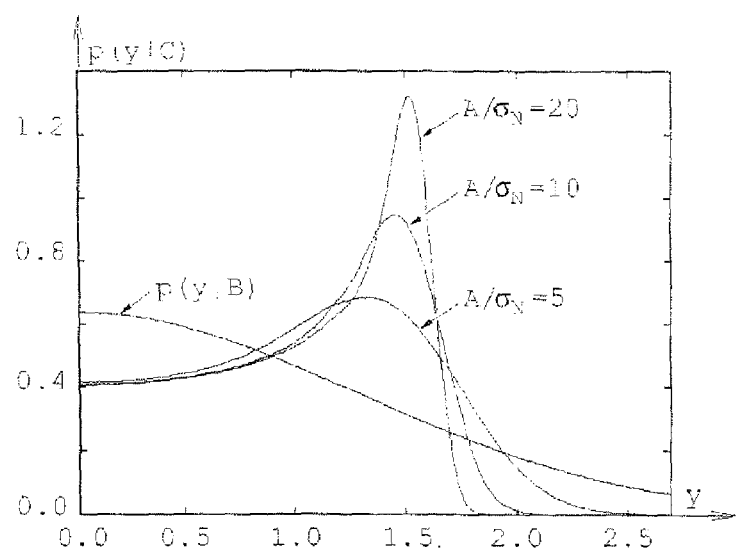
FIG. 1 depicts the shapes of the probability density function p(y|C) of the amplitude of a sine wave corrupted by noise and the probability density function p(y|B) of the noise magnitude.

FIG. 1 depicts the shapes of a probability density function p(y|C) that represents $p_0(y)$ for selected, values of noise level (in this case the ratio $A/\sigma_N$). Each plot has been obtained from a Monte Carlo computer study utilising $10^8$ replications, although it will be appreciated that other representations of $p_0(y)$ can be used to produce a probability density function dependent upon noise level. As can be seen, when the argument y approaches zero, the density functions assume values close to the limit of $4/\pi^2 \approx 0.4$, as predicted by Equation 12.

For comparison purposes, FIG. 1 also shows the probability density function p(y|B) of a noise burst B.

The log-likelihood ratio is defined as:

$$\ln L = \frac{1}{K} \sum_{k=1}^{K} [\ln p(y_k|C) - \ln p(y_k|B)] \qquad \text{Eqn. 13}$$

The presence of a frequency chirp C will be declared when the log-likelihood ratio, as defined in Equation 13, exceeds a predetermined decision threshold; otherwise, the samples being processed will be classified as those representing a noise burst B.

More particularly, as will be explained below, in accordance with an embodiment of the invention, the presence of an interfering chirp C will be declared when a suitable decision threshold, $T_{CG}$, has been exceeded by the average $G_K$ of K nonlinearly transformed samples $y_1, y_2, \ldots, y_k, \ldots, y_K$, as shown in Equation 14.

$$G_K \triangleq \frac{1}{K} \sum_{k=1}^{K} D(y_k) > T_{CG} \qquad \text{Eqn. 14}$$

where the nonlinear transform, D(y), is a suitable representation of the function $[\ln p(y_k|C) - \ln p(y_k|B)]$, appearing in Equation 13 that has been devised by the present inventor.

In the following, an interference classifier utilising normalisation based on mean absolute deviation will be referred to herein as a robust interference classifier.

The nonlinearity, D(y), can be expressed in a closed form only when background noise is negligible, i.e. when $\Psi = A/\sigma_N \to \infty$. In such a case:

$$\lim_{\Psi \to \infty} D(y) = \ln 2 - \frac{1}{2} \ln(\pi^2 - 4y^2) + \frac{y^2}{\pi}, 0 \leq y \leq \frac{\pi}{2} \qquad \text{Eqn. 15}$$

Figure 2:
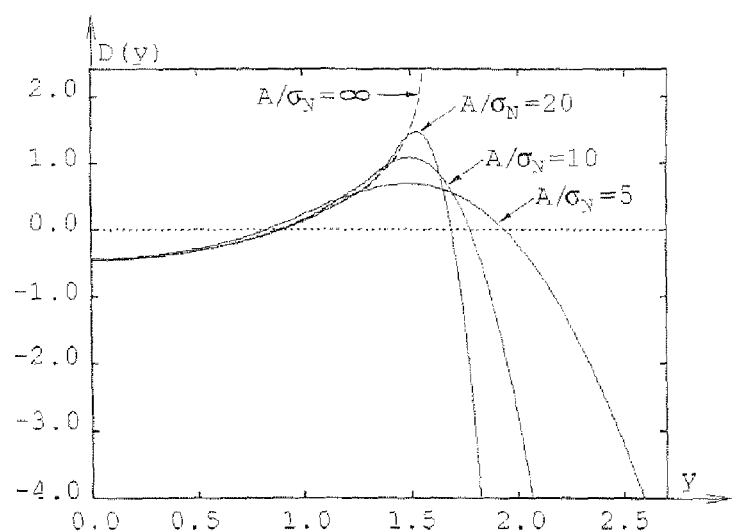
FIG. 2 shows the shapes of the nonlinearity D(y) utilised in an interference classifier in accordance with an embodiment of the invention.

FIG. 2 depicts the shapes of nonlinearity, D(y), for selected values of the ratio $A/\sigma_N$. Each plot has been obtained from a Monte Carlo computer study utilising $10^8$ replications.

When the argument y approaches zero, the nonlinearity, D(y), assumes values close to the limit, $\ln(2/\pi) \approx -0.45$, predicted from the above equation. For comparison purposes, FIG. 2 also shows the nonlinearity, D(y), for negligible background noise, i.e. when $A/\sigma_N \to \infty$.

As will be seen from FIG. 2, the shapes of the nonlinearity, D(y), are substantially the same for the different values of $A/\sigma_N$, with the maximum value of D(y) increasing as the value of $A/\sigma_N$ increases. In all cases, the maximum value occurs for values of y in the range of 1.4 to 1.7.

In accordance with one embodiment of the invention, the nonlinearity, D(y), is approximated by a superposition of two standard functions; namely, a Lorentz function and a parabola.

Irrespective of the ratio $A/\sigma_N$, the nonlinearity, D(y), can be viewed as being composed of two branches that merge at the peak of D(y). The left branch of D(y) can be approximated by a portion of a down-shifted Lorentz function of the form:

$$D(y) \approx \frac{\beta}{(y-\alpha)^2 + \varepsilon} - \delta, \, 0 < y < y_0 \qquad \text{Eqn. 16}$$

The right branch can be represented by a portion of a parabola:

$$D(y) \approx -ay^2 + by - c, \, y_0 < y < \infty \qquad \text{Eqn. 17}$$

Figure 3:
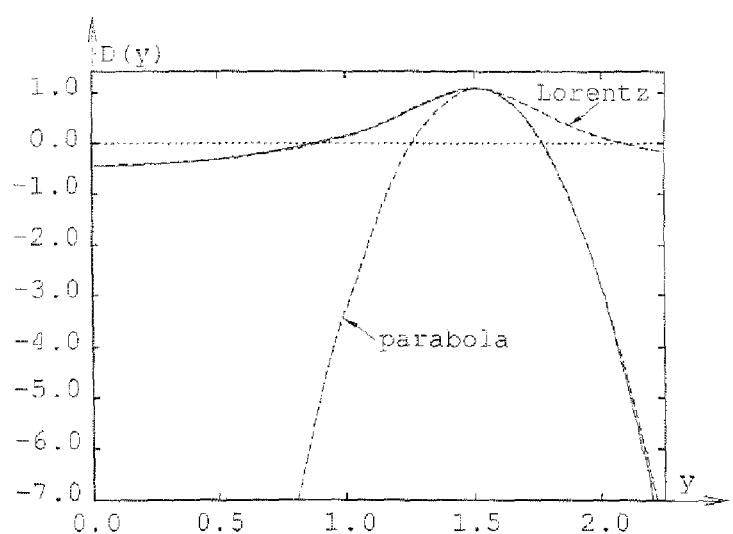
FIG. 3 depicts a nonlinearity D(y) and also its approximation utilised in an interference classifier in accordance with an embodiment of the invention.

For example, when $A/\sigma_N = 10$, a good approximation has been achieved with the following parameter values:

$y_0 = 1.54; \alpha = 1.5, \beta = 0.3, \varepsilon = 0.182, \delta = 0.57; a = 16.36,$
$b = 49.55, c = 36.446$ FIG. 3 depicts a nonlinearity, D(y), for $A/\sigma_N = 10$ and also its approximation constructed in accordance with an embodiment of the invention using the combination of a Lorentz function and a parabola.

In accordance with further embodiments of the invention, the nonlinearity, D(y), can be approximated in many different ways. However, each approximation will attempt to represent and mimic, in some sense, the general shape of nonlinearities depicted in FIG. 2. For example, the left branch can be approximated with a straight line and the right branch can be approximated with a different straight line.

Therefore, in each case, the approximating function will exhibit a peak, or a plateau, at a transition value comprising an argument value of $$\frac{\pi}{2}$$

when there is no noise or between approximately 1.4 and 1.7 when noise is present (the argument value deviating from $$\frac{\pi}{2}$$

due to the diffusing effects of the noise, with the amount of deviation dependent upon the amount of noise). For argument values not exceeding the transition value, the approximating function will be a non-decreasing function. Furthermore, for argument values equal to, or greater than, the transition value, the approximating function will be a decreasing function. In general, the steepness of this falling portion will be much greater than that of the non-decreasing portion, preceding the peak (or plateau).

Normalisation Utilising Standard Deviation—Optimal Classifier

The application of mean absolute deviation in the normalising procedure can be regarded as a practical and also statistically robust approach. However, from a theoretical point of view, the use of standard deviation for this purpose may be preferred.

Therefore, in accordance with a further embodiment of the invention, a primary sequence $\{x_k\}$ of observed samples is converted into a corresponding secondary sequence $\{y_k\}$ by applying a normalising transformation:

$$y_k = \frac{|x_k|}{S_n}, \, k = 1, 2, \ldots, K \qquad \text{Eqn. 18}$$

where, $S_D$ is the standard deviation determined from:

$$S_D = \sqrt{\frac{1}{K} \sum_{k=1}^{K} x_k^2} \qquad \text{Eqn. 19}$$

In the case of a noise burst B, the standard deviation $S_D$ is simply equal to $\sigma_B$, i.e. the rms value of the sum of background noise and burst noise (see Equation 8). When a chirp C with amplitude A is observed, and the level of background noise is low (say, $\sigma_N < A/5$), the rms value is approximately equal to:

$$S_D \approx \frac{A}{\sqrt{2}} \qquad \text{Eqn. 20}$$

In the case of a noise burst B, samples $\{y_k\}$ represent realizations of a Gaussian non-negative random variable with probability density function:

$$p(y \mid B) = \sqrt{\frac{2}{\pi}} \exp\left(-\frac{y^2}{2}\right), \, y \geq 0 \qquad \text{Eqn. 21}$$

When a chirp C is observed, the probability density function $p(y|C)$ can be expressed in a closed form only when background noise is negligible, i.e., when $A/\sigma_N \gg 1$. In such a case:

$$p(y \mid C) = \frac{2}{\pi \sqrt{2 - y^2}}, \, 0 \leq y \leq \sqrt{2} \qquad \text{Eqn. 22}$$

On the other hand, when background noise is present $p(y|C)$ can be regarded as a representation of the underlying ordinary probability density function $p_0(y)$ when diffusing effects of added noise are taken into account, where $$p_0(y) = \frac{2}{\pi \sqrt{2 - y^2}}, \, 0 \leq y \leq \sqrt{2}.$$

The discrepancy between the shape of the representation $p(y|C)$ and that of the underlying probability density function $p_0(y)$ will increase for higher levels of added noise.

As in the case of the robust classifier described above, a Monte Carlo computer simulation can be used to produce a representation $p(y|C)$ for a selected value of noise level. Alternatively, other forms of representation may be used.

Accordingly, the presence of an interfering chirp C will be declared when a predetermined decision threshold $T_{CH}$ has been exceeded by the average $H_K$ of K nonlinearly transformed samples $y_1, y_2, \ldots, y_k, \ldots, y_K$, as shown in Equation 23.

$$H_K \triangleq \frac{1}{K}\sum_{k=1}^{K} V(y_k) > T_{CH} \qquad \text{Eqn. 23}$$

where the nonlinear transform V(y) is a suitable representation of the function [ln p($y_k$|C)−ln p($y_k$|B)].

In this case, the nonlinearity, V(y), has a shape different from that exhibited by the nonlinearity, D(y), described previously.

In the following, an interference classifier utilising normalisation based on standard deviation will be referred to herein as optimal interference classifier, to reflect the fact that, for a Gaussian random variable, its standard deviation is the best estimator of scale.

The nonlinearity, V(y), can be expressed in a closed form only when background noise is negligible, i.e. when $\Psi = A/\sigma_N \to \infty$. In such a case:

$$\lim_{\Psi \to \infty} V(y) = \frac{1}{2}\ln\left(\frac{2}{\pi}\right) - \frac{1}{2}\ln(2-y^2) + \frac{y^2}{2}, \quad 0 \le y \le \sqrt{2} \qquad \text{Eqn. 24}$$

Figure 4:
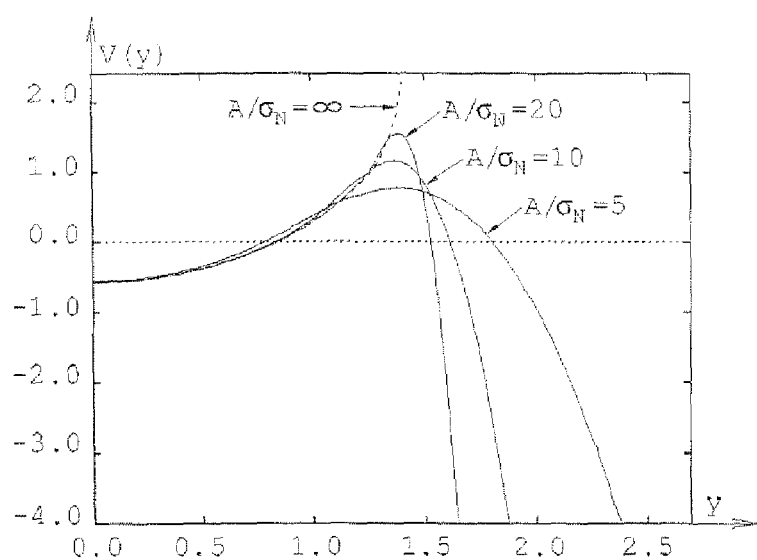
FIG. 4 shows the shapes of the nonlinearity V(y) utilised in an interference classifier in accordance with an embodiment of the invention.

FIG. 4 depicts the shapes of nonlinearity, V(y), for selected values of the ratio $A/\sigma_N$. Each plot has been obtained from a Monte Carlo computer study utilising $10^8$ replications.

When the argument y approaches zero, the nonlinearity, V(y), assumes values close to the limit, −(ln π)/2≈−0.57, predicted from Equation 24.

For comparison purposes, FIG. 4 also shows the nonlinearity V(y) for negligible background noise, i.e. when $A/\sigma_N \to \infty$.

As will be seen from a comparison of FIG. 4 with FIG. 2, the shapes of the two nonlinearities, D(y) and V(y), are substantially the same. In the case of the nonlinearity V(y), however, the maximum value occurs for a value of y at $\sqrt{2}$ when there is no noise or a value in the approximate range 1.3 to 1.6 when noise is present (the argument value deviating from $\sqrt{2}$ due to the diffusing effects of the noise, with the amount of deviation dependent upon the amount of noise), whereas the maximum value of D(y) occurs at a value $$\frac{\pi}{2}$$

when there is no noise or occurs in the range 1.4 to 1.7 when noise is present.

Figure 5:
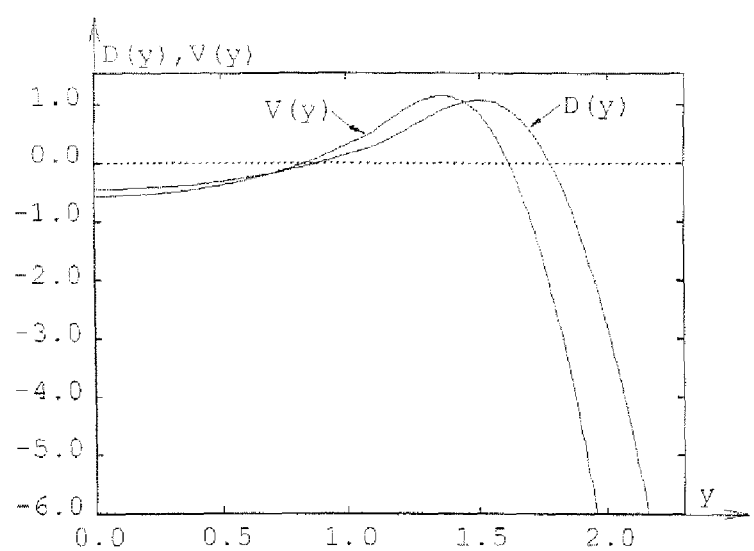
FIG. 5 depicts a nonlinearity D(y) along with a nonlinearity V(y) utilised in interference classifiers in accordance with an embodiment of the invention.

FIG. 5 shows the two nonlinearities, D(y) and V(y), for the case when $A/\sigma_N = 10$. Although both the nonlinearities have similar shapes, the nonlinearity V(y) appears to be superior to D(y) as it seems to offer a better discrimination for the range of arguments of interest.

In embodiments utilising normalisation based on standard deviation, an approximation of the nonlinear function V(y) is applied.

More particularly, in one embodiment, the left branch and right branch of V(y) are approximated, respectively, by a portion of a down-shifted Lorentz function:

$$V(y) \approx \frac{\beta}{(y-\alpha)^2 + \varepsilon} - \delta, \quad 0 < y < y_0 \qquad \text{Eqn. 25}$$

and by a portion of a parabola:

$$V(y) \approx -ay^2 + by - c, \quad y_0 < y < \infty \qquad \text{Eqn. 26}$$

For example, when $A/\sigma_N = 10$, a good approximation has been achieved for the following parameter values:

$y_0 = 1.45; \alpha = 1.365, \beta = 0.361, \varepsilon = 0.1871, \delta = 0.77; a = 17.82, b = 47.41, c = 30.21$ As with D(y), different functions other than a Lorentz function and a parabola can be used to approximate V(y). As these have been described above, they will not be described again here.

Other Normalisation Methods

Although normalisation using mean absolute deviation and standard deviation have been described above, according to further embodiments of the invention, other measures of the mean signal level, such as geometric mean, median or trimmed mean can be used to normalise the signal samples.

A geometric mean, $M_G$, of K signal samples $|x_1|, |x_2|, \ldots, |x_k|, \ldots, |x_K|$ is defined by:

$$M_G \triangleq \sqrt[K]{|x_1| \cdot \ldots \cdot |x_K|} \qquad \text{Eqn. 27}$$

For normalisation purposes, median or trimmed mean can be determined from K signal samples ordered in an ascending order, such that $|x|_{(1)} < |x|_{(2)} < \ldots < |x|_{(k)} < \ldots < |x|_{(K)}$.

Then, the sample median is equal to a middle sample, if K is an odd number; otherwise, when K is even, the sample median equals an arithmetic mean of two middle samples.

A trimmed mean, $M_L$, is obtained by discarding L largest samples and determining the arithmetic mean of the retained samples, hence:

$$M_L = \frac{1}{K-L}\sum_{k=1}^{K-L} |x|_{(k)} \qquad \text{Eqn. 28}$$

There are still other measures of the mean signal level that can be exploited for normalisation purposes.

Whatever measure of the mean signal level is used to perform normalisation, the resulting nonlinearity will have the same form and properties as the nonlinearities D(y) and V(y) described above. Thus, each nonlinearity will have a maximum value at a transition value comprising a value of y between 1.3 and 1.7, and can be approximated by a non-decreasing function for values of y not exceeding the transition value and a decreasing function for values of y at or greater than the transition value. In all cases, the magnitude of the mean slope of the decreasing function will be greater than that of the non-decreasing function.

Practical Embodiments

An interference classifier for implementing the above-described advantageous interference classification according to an embodiment of the invention is described below.

Figure 6:
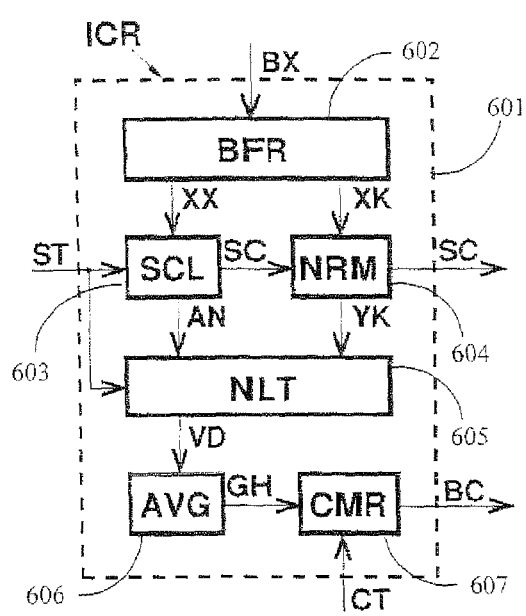
FIG. 6 is a functional block diagram of an interference classifier configured in accordance with a practical embodiment of the invention.

FIG. 6 is a functional block diagram of an interference classifier ICR 601 configured in accordance with an embodiment of the invention. The classifier ICR 601 comprises the following blocks:
a data buffer BFR 602
a normaliser NRM 604
a scale factor calculator SCL 603
a nonlinear transformer NLT 605 an averaging circuit AVG 606 a comparator CMR 607.

The operation of the interference classifier ICR 601 is described below:

A number K of signal samples $x_1, x_2, \ldots, x_k, \ldots, x_K$ forming a data block under examination are transferred via input BX to the data buffer BFR 602.

Samples, available at output XX are used by the scale factor calculator SCL 603 to determine a scale factor SC, such as the mean absolute deviation $M_A$ or the standard deviation $S_D$. The selected type of normalisation is set via input ST of the scale factor calculator SCL 603. In particular, the classifier ICR 601 can be configured, for example, to operate as either the robust classifier or the optimal classifier as described earlier.

The scaling factor SC, determined by the block SCL 603, is supplied to the normaliser NRM 604 to calculate K normalised samples of a secondary sequence:

$$y_1 = \frac{|x_1|}{SC}, y_2 = \frac{|x_2|}{SC}, \ldots, y_k = \frac{|x_k|}{SC}, \ldots, y_K = \frac{|x_K|}{SC} \quad \text{Eqn. 29}$$

where the normalised samples $y_1, y_2, \ldots, y_K$ respectively correspond to the primary signal samples $x_1, x_2, \ldots x_k, \ldots, x_K$ received via input XK from the data buffer BFR 602.

The nonlinear transformer NLT 605 utilises each normalised sample $y_k$, appearing at input YK, to determine a corresponding value, such as $D(y_k)$ or $V(y_k)$, as described earlier.

The nonlinear transformer NLT 604 receives two parameters, namely the type of nonlinearity ST (corresponding to the selected method of normalisation) and a nominal value, AN, of the ratio of chirp amplitude A and an rms value $\sigma_N$ of background noise.

A default value of $A/\sigma_N=10$ may be automatically chosen as the nominal value of AN. Alternatively, a suitable value of AN can be determined as follows.

Assume that for a reliable operation of the system incorporating the interference classifier, the level of a signal being processed should be at least g1 times greater than the rms value $\sigma_N$ of background noise. Assume also that a signal having such a minimum level of $(g1 \cdot \sigma_N)$ will be distorted in a destructive way when the smallest amplitude A of sinusoidal interference is g2 times greater than this minimum level; hence, $A=g2 \cdot (g1\sigma_N)$ and $AN \triangleq A/\sigma_N = g2 \cdot g1$. For example, if g1=5 and g2=2, then $AN=A/\sigma_N=10$.

Furthermore, as seen from FIG. 2 and FIG. 4, the shape of the respective nonlinearities, D(y) and V(y), does not change significantly when $A/\sigma_N$ increases from, say, 10 to 20. Also, sinusoidal interference with larger values of amplitude A can always be detected more reliably. Therefore, the nominal value of AN used by the classifier is preferably selected so as to correspond to lower operational values of the ratio $A/\sigma_N$.

The averaging circuit AVG 606 determines the average, GH, of the nonlinearly-transformed normalised samples received at input VD.

The calculated average GH is compared to a decision threshold. CT in the comparator CMR 607. When the decision threshold CT has been exceeded by the average GH, the presence of interfering chirp will be declared; otherwise, the samples being processed will be classified as those representing an interfering burst of noise.

The decision about the class of interference, noise burst B or frequency chirp C, is provided at output BC of the comparator CMR 607. Additionally, output SC provides the scale factor indicative of the level of interference being classified.

Figure 7:
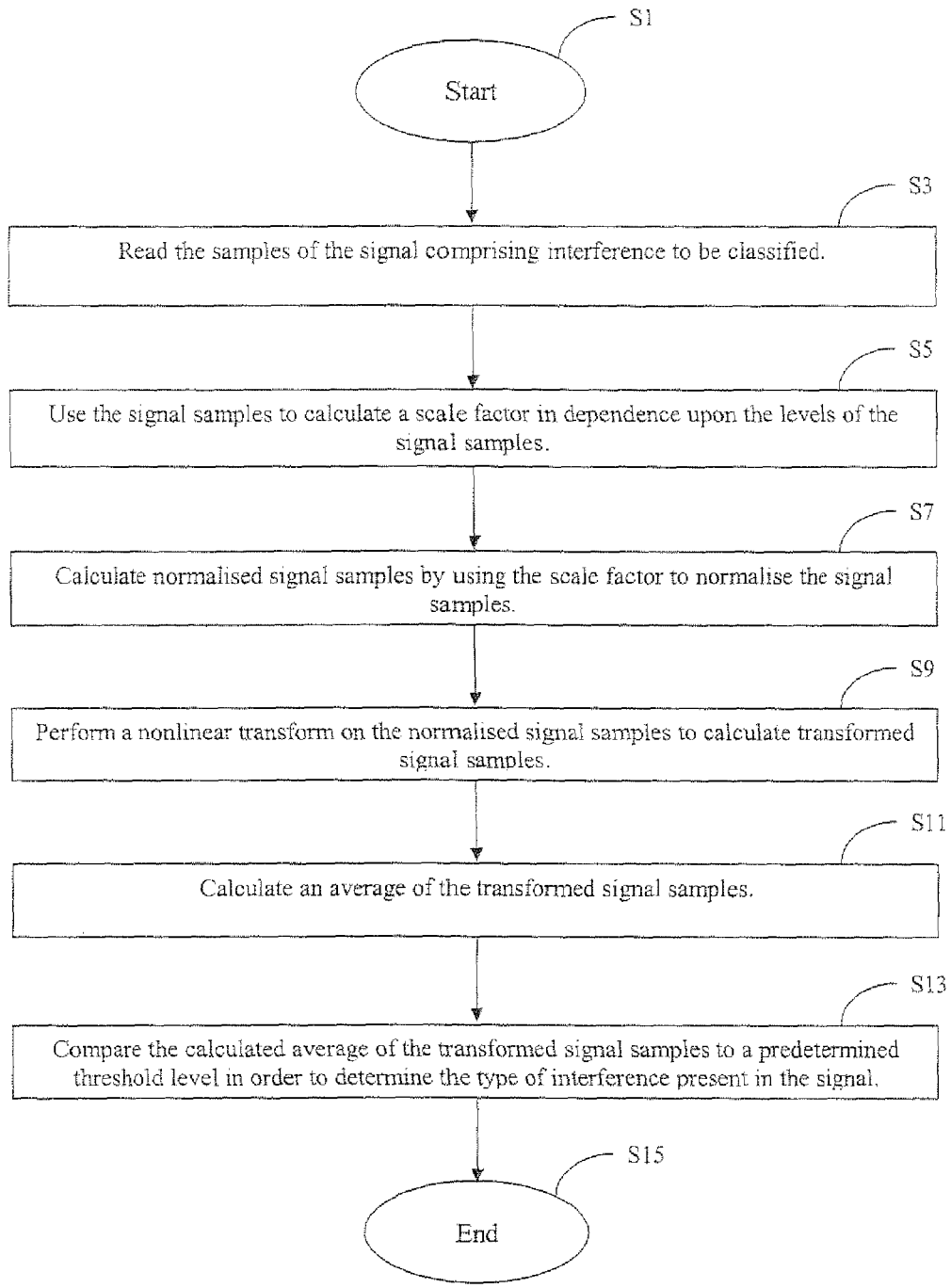
FIG. 7 is a flow chart showing a method of determining a type of interference present in a signal according to an embodiment of the invention.

A summary of the processing operations performed by the interference classifier ICR 601 of the present embodiment to determine the type of noise present in a signal is shown in FIG. 7.

Referring to FIG. 7, at step S3, samples of the signal comprising interference to be classified are read from data buffer BFR 602.

The process then proceeds to step S5, at which a scale factor for the samples is calculated in dependence upon the levels of the signal samples using one of the techniques described above.

The process then proceeds to step S7, at which the scale factor is used to normalise the signal samples to calculate normalised signal samples using one of the normalisation techniques described above.

The process then proceeds to step S9, at which a nonlinear transform is performed on the normalised signal samples to calculate transformed signal samples using one of the techniques described above.

The process then proceeds to step S11, at which an average of the transformed signal samples is calculated using one of the techniques described above.

The process then proceeds to step S13, at which the calculated average of the transformed signal samples is compared to a predetermined threshold level in order to determine the type of interference present in the signal.

The process then proceeds to step S15 at which it ends.

An extensive Monte Carlo simulation study has shown that the interference classifier constructed in accordance with embodiments of the invention outperforms prior-art kurtosis-based classifiers.

The advantages are demonstrated in the example provided below wherein there were K=16 samples per data block and the false-alarm probability was fixed at PFA=0.01.

The decision threshold CT and the probability of detection PD for each classifier are given below:

|    | kurtosis | robust | optimal |
|----|----------|--------|---------|
| PD | 0.57     | 0.62   | 0.64    |
| CT | 1.57     | 0.234  | 0.243   |

In the above context, the probability of detection PD is the probability of deciding "chirp C present" when, indeed, a chirp C is present; the false-alarm probability PFA is the probability of deciding "chirp C present", when, in fact, a noise burst B is present.

Each value given above has been obtained from a Monte Carlo computer study utilising $10^6$ replications. As seen, robust and optimal versions of the embodiments of the interference classifier offer, respectively, 5% and 7% improvement in detection probability PD with respect to a prior-art kurtosis-based classifier.

The interference classifier 601 according to embodiments of the invention has applications in many different fields.

By way of example, a frequency-modulated continuous-wave (FMCW) automotive radar system employing an interference classifier according to an embodiment of the invention will now be described.

Figure 8:
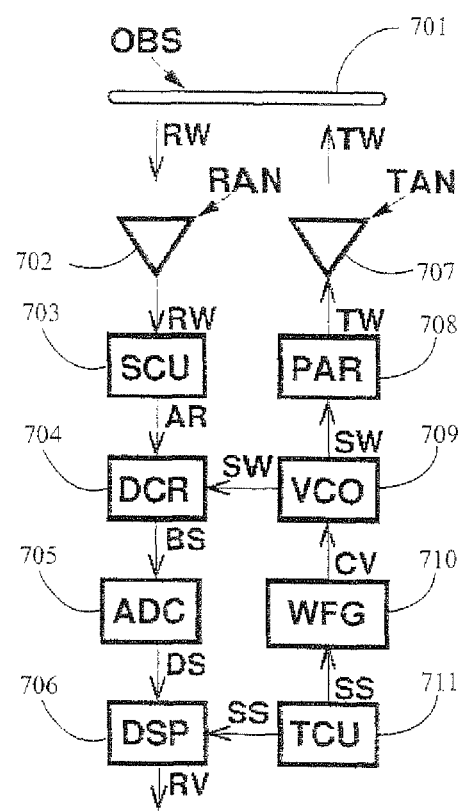
FIG. 8 is a simplified functional block diagram of conventional FMCW automotive radar.

FIG. 8 is a simplified functional block diagram of a conventional FMCW automotive radar system. The system comprises a receive antenna RAN 702, a signal conditioning unit SCU 703, a down-converter DCR 704, an analogue-to-digital converter ADC 705, a digital signal processor DSP 706, a timing/control unit TCU 711, a waveform generator WFG 710, a voltage-controlled oscillator VCO 709, acting also as an up-converter, a power amplifier/driver PAR 708 and a transmit antenna TAN 707.

The waveform generator WFG 710 supplies a control signal CV to make the voltage-controlled oscillator VCO 709 produce frequency up-sweeps and down-sweeps. Each resulting waveform SW is amplified in the power amplifier/driver PAR 708 to produce a probing waveform TW. The waveform TW transmitted by the antenna TAN 707 has a constant amplitude but its frequency sweeps the band of during each up-sweep or down-sweep time interval $T_S$.

The echo RW from an obstacle OBS 701 at range R is an attenuated copy of the transmitted waveform TW, delayed in time by (2R/c), where c is the speed of light.

The echo RW is suitably processed in the signal conditioning unit SCU 703 to produce a representation AR of the reflected signal. The signal AR is combined in the down-converter DCR 704 with a copy SW of the transmitted waveform TW supplied by the voltage-controlled oscillator VCO 709. Output signal BS of the down-converter DCR 704 is first converted to a digital form, DS in the analogue-to-digital converter ADC 705, and then sent to the digital signal processor DSP 706.

The digital signal processor DSP 706 receives from the timing/control unit TCU 711 a signal SS indicative of the parameters of each frequency sweep: its start time, sweep duration $T_s$ and swept frequency band $\Delta f$. The signal SS is also used by the waveform generator WFG 710 to produce a required control signal CV.

The digital signal processor DSP 706 determines the range R and velocity V of obstacle OBS 701 by analyzing beat signals BS received from the down-converter DCR 704. A beat signal BS is obtained in response to a corresponding linear frequency sweep SW of the transmitted waveform TW; the beat frequency being defined as the frequency of a reflected wave RW minus the frequency of a transmitted wave TW.

For a stationary obstacle OBS 701, the beat-frequency magnitude $|f_R|$ is directly proportional to obstacle range R:

$$|f_R| = \left(\frac{|\Delta f|}{T_S}\right)\left(\frac{2 \cdot R}{c}\right) = \frac{2 \cdot |S_F|}{c} \cdot R \qquad \text{Eqn. 30}$$

where $|S_F|=\Delta f/T_S$ is the slope of a frequency sweep. The beat frequency $f_R$ is positive for frequency down-sweeps ($S_F<0$), and negative for frequency up-sweeps ($S_F>0$). Discrimination between positive and negative beat frequencies can be accomplished by employing quadrature signal down-conversion.

A relative movement with radial velocity V between the radar and obstacle OBS 701 will modify the 'range-generated' beat frequency $f_R$ by adding a Doppler frequency shift:

$$f_V = \frac{2 \cdot V}{\lambda} \qquad \text{Eqn. 31}$$

where, $\lambda$ is the wavelength of transmitted waveform TW. In practice, the value of Doppler shift $f_V$ will not be affected by the amount of swept frequency.

For an obstacle OBS 701 approaching the radar with velocity V, the Doppler shift $f_V$ will be positive, whereas the shift $f_V$ will be negative for an obstacle OBS 701 moving away from the radar. Consequently, the observed beat frequency $f_B$ will result from a combination of the two frequency components, $f_R$ and $f_V$; hence:

$$f_B = -\left(\frac{2S_F}{c}\right) \cdot R + \left(\frac{2}{\lambda}\right) \cdot V \qquad \text{Eqn. 32}$$

It is noted that the slope $S_F$ itself can be negative (for a down-sweep) or positive (for an up-sweep).

In the case of a single moving obstacle OBS 701, at least two frequency sweeps with substantially different slopes $S_F$ will be required to determine in a unique way both the range R and the relative velocity V of the obstacle. However, when there are two or more obstacles present in the radar's field of view (FOV), more frequency sweeps with distinct slopes will be needed to correctly determine the range and velocity of each obstacle.

From the above discussion it follows that information about ranges and velocities of obstacles is contained in the frequency components of a plurality of beat signals, each such beat signal being obtained in response to a corresponding frequency sweep transmitted by the radar. Therefore, reliable frequency estimation carried out by the digital signal processor DSP 706 is of primary importance.

An analysis presented in: G. M. Brooker, "Mutual Interference of Millimeter-Wave Radar Systems," *IEEE Trans. Electromagn. Compat.*, pp. 170-181, February 2007, has shown that the sweep patterns and associated signal processing techniques commonly used in automotive radar are all susceptible to multiuser interference.

Consequently, when the above-described automotive FMCW radar system operates in a multiuser environment, it can provide unreliable obstacle detection and poor estimation of its range and velocity.

Automotive FMCW radar systems can therefore be improved by incorporating means of efficient rejection or suppression of interference.

Accordingly, in a further embodiment of the invention, the interference classifier 601 of the previously described embodiments is used in an automotive radar system to determine whether interference is caused by noise bursts or frequency chirps. This allows the system to mitigate the effects of chirp interference by changing the characteristics of a waveform transmitted by the automotive radar and/or by applying blanking to reduce the chirp interference in the signal that is processed to calculate range and/or velocity.

Figure 9:
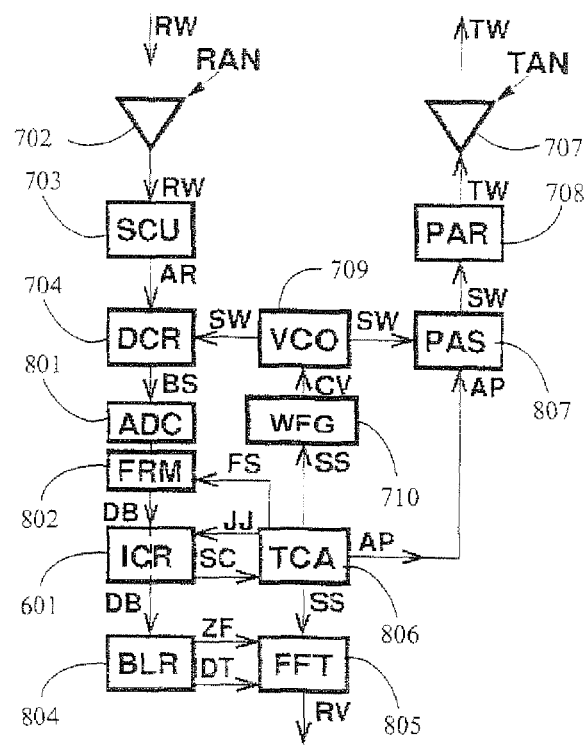
FIG. 9 is a functional block diagram of FMCW automotive radar incorporating an interference classifier in accordance with an embodiment of the invention.

FIG. 9 is a simplified functional block diagram of FMCW automotive radar system in accordance with the further embodiment of the invention.

The automotive radar system comprises the following blocks:
a receive antenna RAN 702
a signal conditioning unit SCU 703
a down-converter DCR 704
an analogue-to-digital converter ADC 801
a Fourier signal processor FFT 805
a timing/control/arithmetic unit TCA 806
a waveform generator WFG 710
a voltage-controlled oscillator VCO 709
a power amplifier/driver PAR 708 a transmit antenna TAN 707
a mode switch PAS 807
a buffer/slicer FRM 802
an interference classifier ICR 601
a blanking circuit BLR 804.

The FMCW automotive radar is arranged to operate alternately in two modes: passive and active.

The purpose of the passive mode is to dynamically and adaptively select a frequency sweep pattern that will not be excessively disrupted by multiuser interference.

In active mode, the radar may perform the usual operations of a known system, such as that shown in FIG. 8; however, blanking is also applied to data within received signals to improve the determination of a range and/or velocity of an object.

Passive Mode

The radar system remains in the passive, or 'listen-only', operating mode so long as the mode switch PAS 807 is blocking the signal path between the voltage-controlled oscillator VCO 709 and the power amplifier/driver PAR 808.

In the passive mode, the radar antenna TAN 707 does not transmit any frequency sweeps. However, such sweeps SW are still generated by the VCO 709 and applied to the down-converter DCR 704.

The mode switch PAS 807 is controlled by a signal AP provided by the timing/control/arithmetic unit TCA 806.

During the passive operating mode, both the Fourier signal processor FFT 805 and the blanking circuit BLR 804 remain idle.

The TCA unit 806 selects sequentially different frequency sweeps SW by applying suitable signals SS to the waveform generator WFG 710 that, in response, produces corresponding control signals CV. As a result, the voltage-controlled oscillator VCO 709 generates a sequence of distinct frequency sweeps SW, each sweep being characterized by its:
- start frequency
- stop frequency
- sweep duration.

For ranking purposes to be described below, each different frequency sweep SW is identified by a sweep index $n \in \{1, \ldots, N\}$.

The radar senses the multiuser 'dense-signal' environment by processing signals captured by its receive antenna RAN 702. A received signal RW comprises background noise and signals transmitted by other automotive radars operating in the same region. The representation AR of the received signal RW is processed jointly in the down-converter DCR 704 with each of N frequency sweeps SW supplied by the voltage-controlled oscillator VCO 709.

Output signal BS of the down-converter DCR 704, after conversion to a digital form in the analogue-to-digital converter ADC 801, is stored in the buffer/slicer FRM 802. Each data frame stored in the buffer/slicer FRM 802 will uniquely correspond to one of the N different frequency sweeps SW applied to the down-converter DCR 704.

Each data frame is 'sliced' into a number J of data blocks DB in response to a control signal FS supplied by the TCA unit 806. The resulting data blocks DB are then applied sequentially to the interference classifier ICR 601 in response to a signal JJ provided by the TCA unit 806.

The classifier ICR 601 identifies data blocks containing chirp interference and sends to the TCA unit 806 a signal SC indicative of the level of such interference.

As a result, the TCA unit can determine the number of disrupted data blocks in the data frame and also the total disruptive energy of the multiuser interference. This information is used by the TCA unit to rank the N frequency sweeps SW according to their resistance to the multiuser interference.

Accordingly, during the passive operating mode, all N available frequency sweeps SW are evaluated from a viewpoint of resistance to multiuser chirp interference. The TCA unit 806 then selects the best M sweeps to construct a sweep pattern, or patterns, that will offer good ranging performance in the multiuser environment under test.

Once the M sweeps to be used in a sweep pattern have been selected, a sweep pattern may be constructed in many ways. For example, a random, or pseudorandom, permutation of the sweeps may be utilised.

Active Mode

After the passive mode, the active mode is initiated by the TCA unit 806 applying a suitable control signal, AP, to the mode switch PAS 807.

In the active mode, the radar transmits, via its antenna TAN 707, one or more sweep patterns that have been determined in the passive mode.

In the active mode, the interference classifier ICR 803 remains idle and 'transparent' to data blocks DB stored in the buffer/slicer FRM 802.

Since the one or more sweep patterns used in the active mode have been constructed so as to have good performance in the environment under test in the passive mode, the automotive FMCW radar operates with improved resistance to multiuser interference.

Although selecting the best sweep patterns reduces the effects of mutual interference, the interference may not be eliminated completely. Therefore, the ranging performance of automotive FMCW radar is further improved by incorporating a blanking circuit BLR 804 between the buffer/slicer FRM 802 and the Fourier signal processor FFT 805.

The operations of the blanking circuit BLR 804 will now be described.

A mean level, such as an rms value, of all J data blocks of a data frame, is first determined. An interference detection threshold, referred to herein as a blanking threshold, is then established. For example, the threshold value may be set at four times the data rms value. Preferably, the threshold value is set so as to exceed a fixed multiple (e.g., ten) of the system's noise level.

Next, each of J data blocks is tested. If the rms value of a block under test exceeds the blanking threshold, the data block is replaced with an all-zero block. As a result, the blanking circuit BLR 804 will transfer to the Fourier signal processor FFT 805 a modified data frame ZF with all corrupted data blocks substituted by all-zero blocks. It should be noted that such operation will not change the order in which individual data blocks occur in a data frame. Because the blanking operation will reduce the background noise level, the signal detection threshold used by the Fourier signal processor FFT 805 should also be reduced. Accordingly, the blanking circuit BLR 804 sends a suitably reduced threshold value DT to the processor FFT 805. The modified threshold value DT is proportional to the number of original data blocks retained in the data frame.

The Fourier signal processor FFT 805 receives a signal SS indicative of each frequency sweep parameters: its start time, sweep duration $T_S$ and swept frequency band $\Delta f$.

The Fourier signal processor 805, which may be implemented by a DSP, is arranged to perform a calculation of the range R and/or velocity V of an object.

The automotive FMCW radar may be arranged so that it alternates between the passive and active modes after an operation of each mode, or it may be arranged so that the passive mode is used less frequently.

Illustrative Example

In order to facilitate the understanding of the advantages offered by an automotive radar utilising an embodiment of the interference classifier 601, an example is set out below.

Consider a beat signal comprising three sine waves of different frequencies and background noise of unit rms value. The amplitude of each sine wave is equal to 0.27; such a case may, for example, represent three very small objects appearing in the field-of-view (FOV) of an automotive radar.

FIG. 10 a) depicts a data frame containing 512 samples representing the beat signal. Although the sine waves are well buried in noise, the corresponding frequency components are clearly visible in a frequency-domain representation shown in FIG. 10 b).

FIG. 11 a) shows the same data frame but additionally corrupted by three high-level frequency chirps, each having the same amplitude of 25. For comparison, a blanking-threshold level BTH is also shown. In this case, a frequency-domain representation depicted in FIG. 11 b) is dominated by a plurality of frequency components of interfering chirps, and frequency components of interest are not detectable.

An attempt to apply the blanking procedure fails in this case, as seen from FIG. 12 a) and FIG. 12 b) that depict, respectively, a data frame modified by a blanking operation that has removed the high-level frequency chirps and the frequency-domain representation of the data frame.

FIG. 13 a) shows a corresponding data frame when a frequency sweep transmitted by the automotive radar has been suitably shifted in frequency (i.e. a different sweep pattern is used), and one of the three interfering chirps has been avoided. However, in the a frequency-domain representation shown in FIG. 13 b), the frequency components of interest are still difficult to detect.

To improve detection, blanking is applied to the data frame shown in FIG. 13 a) with a suitable blanking-threshold level BTH, such as that shown in FIG. 13 a). The modified data frame is depicted in FIG. 14 a), and contains two all-zero data blocks that have replaced original blocks corrupted by interfering chirps.

A frequency-domain representation of the modified data frame, shown in FIG. 14 b), clearly reveals the presence of the desired three frequency components, all above the detection threshold.

In the above example, blanking alone was not sufficient to suppress effects of multiuser interference. However, by using adaptive selection of transmitted frequency sweeps together with signal blanking, reliable detection was achieved.

However, in alternative scenarios, adaptive selection of transmitted frequency sweeps alone may be sufficient to achieve reliable detection, without further requiring signal blanking.

As demonstrated above, automotive radar is improved by utilising an adaptive waveform optimization based upon a discrimination between natural and man-made interference performed by an interference classifier in accordance with an embodiment of the present invention.

Modifications and Variations

Many modifications and variations can be made to the embodiments described above.

For example, the embodiment shown in FIG. 6 comprises hardware components. However, an embodiment may be implemented using software, firmware or any combination of software, firmware and hardware. For example, FIG. 15 shows an embodiment in which the scale factor calculator SCL 603, normaliser NRM 604, nonlinear transformer NTT 605, averaging circuit AVG 606 and comparator CMR 607 are all implemented by a programmable processing apparatus 1503 programmed by computer program instructions to perform the processing operations previously described. The computer program instructions are provided, for example, on a computer program product such as storage medium 1501 or signal 1502.

In the embodiments described above, uniform sampling of the received signal is performed to generate the signal samples for processing. However, instead, non-uniform sampling, including non-deterministic sampling, may be performed to ensure that the samples are not synchronised with an interfering sine wave.

The FMCW automotive radar embodiments described above are provided as examples of how an interference classifier according to an embodiment can be used to identify frequency chirps. However, it will be appreciated that the interference classifier has much wider applicability and can be used, for example, to identify interference whose frequency changes in an abrupt or non-continuous manner, and non-deterministic interference signals.

The foregoing description of embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilise the invention in various embodiments suited to the particular use contemplated.

The invention claimed is:

1. An interference classifier for determining whether a received signal contains a noise burst or interference comprising a sinusoidal signal, the interference classifier comprising:

a buffer operable to receive and store data comprising samples of a signal;

a scale factor calculator operable to calculate a scale factor for the signal samples in dependence upon the levels of the received signal samples;

a normaliser operable to calculate normalised signal samples, y, by using the scale factor to normalise the received signal samples;

a nonlinear transformer operable to perform a nonlinear transform, T(y), on the normalised signal samples to calculate transformed signal samples;

an averaging circuit operable to calculate an average level of the transformed signal samples; and a comparator operable to compare the calculated average level of the transformed signal samples to a predetermined threshold level in order to determine whether the signal contains interference comprising a sinusoidal signal;

wherein:

the nonlinear transformer is operable to perform a nonlinear transform, T(y), comprising a combination of a first function, T1(y), and a second function, T2(y), wherein the first function defines the transform to be applied to normalised signal samples having a value not exceeding a transition value, $y_t$, and the second function defines a transform to be applied to normalised signal samples having a value at or above the transition value $y_t$, and wherein:

T1(y) is a non-decreasing function with increasing normalised signal sample values;

T2(y) is a decreasing function with increasing normalised signal sample values; and the transition value, $y_t$, has a value in the range $1.3 \leq y_t \leq 1.7$.

2. An interference classifier according to claim 1, wherein the first function T1(y) is an increasing function with increasing normalised signal sample values, and the magnitude of the mean slope of $T1(y)$ is less than the magnitude of the mean slope of $T2(y)$.

3. An interference classifier according to claim 1, wherein:
the scale factor calculator is arranged to calculate a scale factor that is the mean absolute deviation of the signal samples; and
the nonlinear transformer is operable to perform a nonlinear transform, $T(y)$, comprising a combination of a first function, $T1(y)$, and a second function, $T2(y)$, which approximate a ratio of the conditional probabilities p(y|N1) and p(y|N2), where:

$$p(y|N1) = \frac{2}{\pi}\exp\left(-\frac{y^2}{\pi}\right), y \geq 0;$$

p(y|N2) is a representation of the function $$\frac{4}{\pi\sqrt{\pi^2 - 4y^2}}, 0 \leq y \leq \frac{\pi}{2},$$

dependent upon noise level; and
N1 is burst noise and N2 is interference comprising a sinusoidal signal.

4. An interference classifier according to claim 1, wherein:
the scale factor calculator is arranged to calculate a scale factor that is the standard deviation of the signal samples; and
the nonlinear transformer is operable to perform a nonlinear transform, $T(y)$, comprising a combination of a first function, $T1(y)$, and a second function, $T2(y)$, which approximate a ratio of the conditional probabilities p(y|N1) and p(y|N2), where:

$$p(y|N1) = \sqrt{\frac{2}{\pi}}\exp\left(-\frac{y^2}{2}\right), y \geq 0;$$

p(y|N2) is a representation of the function $$\frac{2}{\pi\sqrt{2 - y^2}},$$

$0 \leq y \leq \sqrt{2}$, dependent upon noise level; and
N1 is burst noise and N2 is interference comprising a sinusoidal signal.

5. An interference classifier according to claim 1, wherein the scale factor calculator is operable to calculate one of the mean absolute deviation, the standard deviation, the geometric mean, median and trimmed mean of the signal samples as the scale factor.

6. An interference classifier according to claim 1, wherein the normaliser is operable to determine a magnitude of each signal sample and is operable to calculate the normalised signal samples, y, by dividing the magnitudes of the signal samples by the scale factor.

7. An interference classifier according to claim 1, wherein the nonlinear transformer is operable to perform a nonlinear transform in which the first function $T1(y)$ comprises a Lorentz function and the second function $T2(y)$ comprises a parabola.

8. A method of determining whether a received signal contains a noise burst or interference comprising a sinusoidal signal, the method comprising:
calculating a scale factor in dependence upon the levels of samples of the received signal;
calculating normalised signal samples, y, by using the scale factor to normalise the received signal samples;
performing a nonlinear transform, $T(y)$, on the normalised signal samples to calculate transformed signal samples;
calculating an average level of the transformed signal samples; and
comparing the calculated average level of the transformed signal samples to a predetermined threshold level in order to determine whether the signal contains interference comprising a sinusoidal signal;
wherein:
the nonlinear transform, $T(y)$, comprises a combination of a first function, $T1(y)$, and a second function, $T2(y)$, wherein the first function defines the transform to be applied to normalised signal samples having a value not exceeding a transition value, $y_t$, and the second function defines a transform to be applied to normalised signal samples having a value at or above the transition value $y_t$, and wherein:
$T1(y)$ is a non-decreasing function with increasing normalised signal sample values;
$T2(y)$ is a decreasing function with increasing normalised signal sample values; and
the transition value, $y_t$, has a value in the range $1.3 \leq y_t \leq 1.7$.

9. A method according to claim 8, wherein the first function $T1(y)$ is an increasing function with increasing normalised signal sample values, and the magnitude of the mean slope of $T1(y)$ is less than the magnitude of the mean slope of $T2(y)$.

10. A method according to claim 8, wherein:
the scale factor is the mean absolute deviation of the signal samples; and
the nonlinear transform, $T(y)$, comprises a combination of a first function, $T1(y)$, and a second function, $T2(y)$, which approximate a ratio of the conditional probabilities p(y|N1) and p(y|N2), where:

$$p(y|N1) = \frac{2}{\pi}\exp\left(-\frac{y^2}{\pi}\right), y \geq 0;$$

p(y|N2) is a representation of the function $$\frac{4}{\pi\sqrt{\pi^2 - 4y^2}}, 0 \leq y \leq \frac{\pi}{2},$$

dependent upon noise level; and
N1 is burst noise and N2 is interference comprising a sinusoidal signal.

11. A method according to claim 8, wherein:
the scale factor is the standard deviation of the signal samples; and
the nonlinear transform, $T(y)$, comprises a combination of a first function, $T1(y)$, and a second function, $T2(y)$, which approximate a ratio of the conditional probabilities p(y|N1) and p(y|N2), where:

$$p(y|N1) = \sqrt{\frac{2}{\pi}} \exp\left(-\frac{y^2}{2}\right), y \geq 0;$$

p(y|N2) is a representation of the function $$\frac{2}{\pi\sqrt{2-y^2}},$$

$0 \leq y \leq \sqrt{2}$, dependent upon noise level; and
N1 is burst noise and N2 is interference comprising a sinusoidal signal.

12. A method according to claim 8, wherein the process of calculating normalised signal samples comprises determining a magnitude of each signal sample and calculating the normalised signal samples by dividing the magnitudes of the signal samples by the scale factor.

13. A method according to claim 8, wherein the first function $T1(y)$ of the nonlinear transform comprises a Lorentz function and the second function $T2(y)$ of the nonlinear transform comprises a parabola.

14. A non-transitory storage medium storing computer program instructions which, when executed by a processing apparatus, cause the processing apparatus to perform processing operations to process a received signal to determine whether the received signal contains a noise burst or interference comprising a sinusoidal signal, the processing operations comprising:
   calculating a scale factor in dependence upon the levels of samples of the received signal;
   calculating normalised signal samples, y, by using the scale factor to normalise the received signal samples;
   performing a nonlinear transform, T(y), on the normalised signal samples to calculate transformed signal samples;
   calculating an average level of the transformed signal samples; and
   comparing the calculated average level of the transformed signal samples to a predetermined threshold level in order to determine whether the signal contains interference comprising a sinusoidal signal;
   wherein:
   the nonlinear transform, T(y), comprises a combination of a first function, $T1(y)$, and a second function, $T2(y)$, wherein the first function defines the transform to be applied to normalised signal samples having a value not exceeding a transition value, $y_t$, and the second function defines a transform to be applied to normalised signal samples having a value at or above the transition value $y_t$, and wherein:
   $T1(y)$ is a non-decreasing function with increasing normalised signal sample values;
   $T2(y)$ is a decreasing function with increasing normalised signal sample values; and
   the transition value, $y_t$, has a value in the range $1.3 \leq y_t \leq 1.7$.

15. A non-transitory storage medium according to claim 14, wherein the first function $T1(y)$ is an increasing function with increasing normalised signal sample values, and the magnitude of the mean slope of $T1(y)$ is less than the magnitude of the mean slope of $T2(y)$.

16. A non-transitory storage medium according to claim 14, wherein:
   the scale factor is the mean absolute deviation of the signal samples; and
   the nonlinear transform, T(y), comprises a combination of a first function, $T1(y)$, and a second function, $T2(y)$, which approximate a ratio of the conditional probabilities p(y|N1) and p(y|N2), where:

$$p(y|N1) = \frac{2}{\pi} \exp\left(-\frac{y^2}{\pi}\right), y \geq 0;$$

p(y|N2) is a representation of the function $$\frac{4}{\pi\sqrt{\pi^2 - 4y^2}}, 0 \leq y \leq \frac{\pi}{2},$$

dependent upon noise level; and
N1 is burst noise and N2 is interference comprising a sinusoidal signal.

17. A non-transitory storage medium according to claim 14, wherein:
   the scale factor is the standard deviation of the signal samples; and
   the nonlinear transform, T(y), comprises a combination of a first function, $T1(y)$, and a second function, $T2(y)$, which approximate a ratio of the conditional probabilities p(y|N1) and p(y|N2), where:

$$p(y|N1) = \sqrt{\frac{2}{\pi}} \exp\left(-\frac{y^2}{2}\right), y \geq 0;$$

p(y|N2) is a representation of the function $$\frac{2}{\pi\sqrt{2-y^2}},$$

$0 \leq y \leq \sqrt{2}$, dependent upon noise level; and
N1 is burst noise and N2 is interference comprising a sinusoidal signal.

18. A non-transitory storage medium according to claim 14, wherein the process of calculating normalised signal samples comprises determining a magnitude of each signal sample and calculating the normalised signal samples by dividing the magnitudes of the signal samples by the scale factor.

19. A non-transitory storage medium according to claim 14, wherein the first function $T1(y)$ of the nonlinear transform comprises a Lorentz function and the second function $T2(y)$ of the nonlinear transform comprises a parabola.

* * * * *